US011533136B2

(12) United States Patent
Dudda

(10) Patent No.: US 11,533,136 B2

(45) Date of Patent: Dec. 20, 2022

(54) DISCARD OF PDCP PDU SUBMITTED FOR TRANSMISSION

(71) Applicant: Telefonaktiebolaget LM Ericsson (publ), Stockholm (SE)

(72) Inventor: Torsten Dudda, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 240 days.

(21) Appl. No.: 16/956,756

(22) PCT Filed: Sep. 27, 2018

(86) PCT No.: PCT/EP2018/076356

§ 371 (c)(1), (2) Date: Jun. 22, 2020

(87) PCT Pub. No.: WO2019/137641

PCT Pub. Date: Jul. 18, 2019

(65) Prior Publication Data

US 2020/0322094 A1 Oct. 8, 2020

Related U.S. Application Data

(60) Provisional application No. 62/616,097, filed on Jan. 11, 2018.

(51) Int. Cl.

*H04L 1/18* (2006.01)

*H04L 69/322* (2022.01)

(52) U.S. Cl.

CPC ............ *H04L 1/188* (2013.01); *H04L 69/322* (2013.01)

(58) Field of Classification Search

CPC ........ H04L 1/188; H04L 69/322; H04L 47/32

See application file for complete search history.

(56) References Cited

U.S. PATENT DOCUMENTS 10,893,437 B2 * 1/2021 Wang .................... H04W 28/04

11,018,984 B2 * 5/2021 Decarreau ................. H04L 1/08

(Continued)

FOREIGN PATENT DOCUMENTS

| EP | 2830352 A1 | 1/2015 |
|---|---|---|
| EP | 3065456 A1 | 9/2016 |
| EP | 3121981 A1 | 1/2017 |

OTHER PUBLICATIONS

3rd Generation Partnership Project, "3rd Generation Partnership Project; Technical Specification Group Radio Access Network; NR; NR and NG-RAN Overall Description; Stage 2 (Release 15)", Technical Specification, 3GPP TS 38.300 V15.0.0, Dec. 1, 2017, pp. 1-68, 3GPP.

(Continued)

*Primary Examiner* — Mohamed A. Wasel

(74) *Attorney, Agent, or Firm* — Coats & Bennett, PLLC

(57) ABSTRACT

A method of discarding PDCP PDUs submitted for transmission includes submitting the PDCP PDU to a first entity for transmission over a first physical layer, and submitting the PDCP PDU to a second entity for transmission over a second physical layer. In response to determining that a predetermined time period has elapsed since the submission of the PDCP PDU, the first entity and the second entity are instructed to discard the PDCP PDU without transmission, or one of the first entity and the second entity are instructed to discard the PDCP PDU in response to an indication of transmission or delivery of the PDCP PDU by the other entity. Related apparatus and computer program product(s) are disclosed.

20 Claims, 8 Drawing Sheets

Submitting the PDCP PDU to a first entity for transmission over a first physical layer — 102

Submitting the PDCP PDU to a second entity for transmission over a second physical layer — 104

After a predetermined time following submission of the PDCP PDU to the first entity and/or the second entity, instructing the first entity and the second entity to discard the PDCP PDU without transmission; or instructing the one of the first entity and the second entity to discard the PDCP PDU in response to an indication of transmission or delivery of the PDCP PDU by the other of the first entity and the second entity — 106

100

(56) References Cited

U.S. PATENT DOCUMENTS

| | | | | |
|---|---|---|---|---|
| 11,096,184 | B2 * | 8/2021 | Xu | H04W 24/00 |
| 2016/0338132 | A1 * | 11/2016 | Uchino | H04L 5/001 |
| 2016/0352469 | A1 * | 12/2016 | Xiao | H04L 1/1867 |
| 2016/0374036 | A1 * | 12/2016 | Wang | H04W 28/085 |
| 2017/0064707 | A1 * | 3/2017 | Xiao | H04W 8/04 |
| 2018/0083688 | A1 * | 3/2018 | Agiwal | H04W 48/16 |
| 2019/0150217 | A1 * | 5/2019 | Kim | H04L 1/1809 370/329 |

OTHER PUBLICATIONS

3rd Generation Partnership Project, "3rd Generation Partnership Project; Technical Specification Group Radio Access Network; NR; Packet Data Convergence Protocol (PDCP) Specification (Release 15)", Technical Specification, 3GPP TS 38.323 V15.0.0, Dec. 1, 2017, pp. 1-25, 3GPP.

3rd Generation Partnership Project, "3rd Generation Partnership Project; Technical Specification Group Radio Access Network; NR; Radio Resource Control (RRC) Protocol Specification (Release 15)", Technical Specification, 3GPP TS 38.331 V15.0.0, Dec. 1, 2017, pp. 1-188, 3GPP.

* cited by examiner

DISCARD OF PDCP PDU SUBMITTED FOR TRANSMISSION

TECHNICAL FIELD

Examples of the present disclosure relate to submitting of a PDCP PDU for transmission, for example in a wireless device or a base station.

BACKGROUND

In some wireless communications networks, such as for example Long Term Evolution (LTE), 5G or New Radio (NR) networks, dual connectivity (DC) using a split bearer may be available. With DC a User Equipment (UE) may be connected to two distinct radio nodes. Also, in some networks, carrier aggregation (CA) may be available. With CA, the UE may be connected to one radio node via multiple (e.g. two or more) carriers, and therefore maintains two physical layers (PHY) to the radio node. With CA, the protocol stack may consist of one MAC, RLC, and PDCP entity. Therefore, with CA, data units to be transmitted may be routed via both carriers. With packet duplication, the same packet may be transmitted on each carrier for redundancy.

SUMMARY

One aspect of the present disclosure provides a method for submitting a PDCP PDU for transmission. The method comprises submitting the PDCP PDU to a first entity for transmission over a first physical layer, and submitting the PDCP PDU to a second entity for transmission over a second physical layer. The method also comprises, after a predetermined time following submission of the PDCP PDU to the first entity and/or the second entity, instructing the first entity and the second entity to discard the PDCP PDU without transmission or instructing the one of the first entity and the second entity to discard the PDCP PDU in response to an indication of transmission or delivery of the PDCP PDU by the other of the first entity and the second entity.

Another aspect of the present disclosure provides apparatus for submitting a PDCP PDU for transmission. The apparatus comprises a processor and a memory. The memory contains instructions executable by the processor such that the apparatus is operable to submit the PDCP PDU to a first entity for transmission over a first physical layer, submit the PDCP PDU to a second entity for transmission over a second physical layer, and, after a predetermined time following submission of the PDCP PDU to the first entity and/or the second entity, instruct the first entity and the second entity to discard the PDCP PDU without transmission or instruct the one of the first entity and the second entity to discard the PDCP PDU in response to an indication of transmission or delivery of the PDCP PDU by the other of the first entity and the second entity.

A further aspect of the present disclosure provides apparatus for submitting a PDCP PDU for transmission. The apparatus is configured to submit the PDCP PDU to a first entity for transmission over a first physical layer, submit the PDCP PDU to a second entity for transmission over a second physical layer, and, after a predetermined time following submission of the PDCP PDU to the first entity and/or the second entity, instruct the first entity and the second entity to discard the PDCP PDU without transmission or instruct the one of the first entity and the second entity to discard the PDCP PDU in response to an indication of transmission or delivery of the PDCP PDU by the other of the first entity and the second entity.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
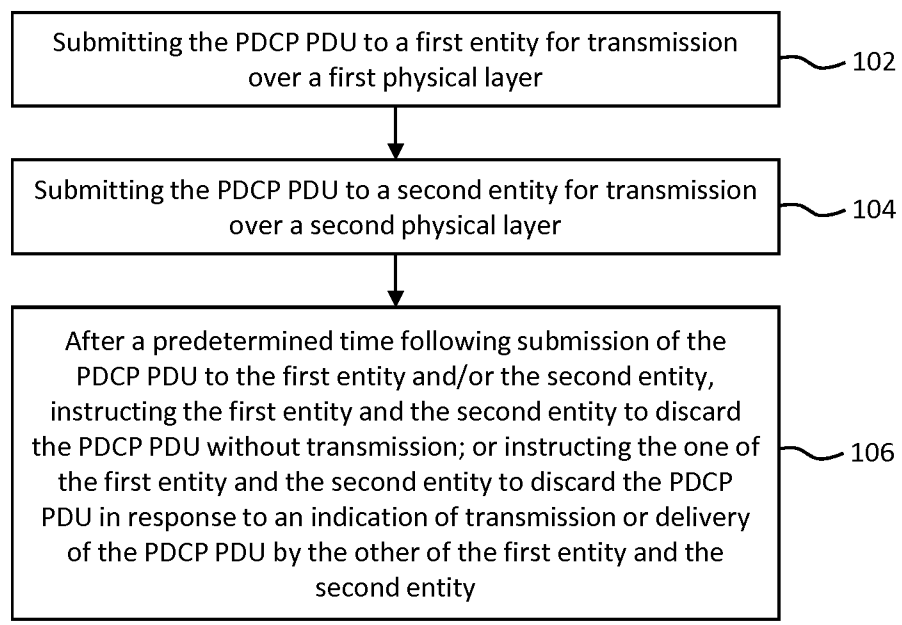
FIG. 1 is a flow chart of an example of a method for submitting a PDCP PDU for transmission.

Some example embodiments will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Some embodiments are described within the context of 3GPP NR radio technology (e.g. 3GPP TS 38.300 V15.0.0 (2017-12)). It should be understood that the problems and solutions described herein are equally applicable to wireless access networks and user-equipments (UEs) implementing other access technologies and standards. For example, embodiments disclosed herein are applicable also to 3GPP LTE, or 3GPP LTE and NR integration, also denoted as non-standalone NR, and/or any other suitable radio access technologies.

In some examples where packet duplication is configured for a radio bearer, for example by a radio resource control (RRC) entity (e.g. software or process), an additional Radio Link Control (RLC) entity and an additional logical channel may be added to the radio bearer to handle the duplicated Packet Data Convergence Protocol (PDCP) Protocol Data Units (PDUs). Duplication may therefore comprise sending the same PDCP PDUs twice: one on the original RLC entity and another on the additional RLC entity. With two independent transmission paths, packet duplication may therefore increase reliability and/or reduce latency and may be used for example for ultra-reliable low latency (URLLC) communications. When duplication occurs, the original PDCP PDU and the corresponding duplicate are in some examples not be transmitted on the same carrier. The two different logical channels can either belong to the same Medium Access Control (MAC) entity (CA) or to different MAC entities (DC). In the former case, logical channel mapping restrictions may be used in the MAC entity to ensure that the logical channel carrying the original PDCP PDUs and logical channel carrying the corresponding duplicates are not sent on the same carrier. Once configured, in some examples duplication can be activated and de-activated per Data Radio Bearer (DRB) by means of a MAC control element (CE).

In NR, PDCP may define two procedures for retransmissions: PDCP entity re-establishment and PDCP data recovery. In PDCP entity re-establishment, which may be used for example after a handover where lower layers are re-established or flushed of all data, the PDCP entity at the target node (after the handover) may retransmit all PDCP Service Data Units (SDUs) that are not yet considered successfully delivered. PDCP data recovery may be used for example when a split bearer is reconfigured to a non-split bearer, e.g. operation is changed from using two lower layer RLC entities to only using one lower layer RLC entity. With PDCP data recovery, PDCP PDUs previously transmitted on the removed RLC entity may be retransmitted on the remaining RLC entity.

A UE can maintain a PDCP entity for a split bearer connected to multiple (e.g. two or more) radio link control (RLC) and medium access control (MAC) entities, as well as physical layer entities (PHY). These are each associated to a cell group, which are for example the master cell group and secondary cell group respectively. Transmission via the master cell group may be via the master base station (e.g. gNB or eNB). In this example, the master base station is considered to be a master gNB, though in other examples may relate to other base station types and technologies. Thus the master base station is referred to as a MgNB. Transmission via the secondary cell group may be via a secondary base station, which in this example is referred to as a SgNB. The MgNB and SgNB may maintain their own RLC and MAC entities associated to the split bearer.

In some examples, it is desirable that PDCP PDU duplicates (e.g. duplicated of the same PDCP PDU) are received within a certain delay at the receiver, as a duplicate PDU received outside of the delay may be outdated. As a result, the duplicate PDU may not improve reliability and/or latency compared to sending only one copy of the PDU and not sending a duplicate.

Certain aspects of the present disclosure and the example embodiments may provide solutions to these or other challenges. For example, a timer (duplicate discard timer) may be associated with each PDU for which one or more duplicates are to be transmitted. In some examples, this timer may be started when the PDU is submitted to be transmitted, e.g. submitted to lower layers (e.g. layers lower than the PDCP entity). At expiry of the timer, e.g. after a predetermined time, the PDCP PDU may be assumed to be successfully transmitted, and duplicate transmission is stopped by indicating discard of this PDU to the lower layer (e.g. one or more RLC entities) which is still to attempt transmission or successful transmission. The timer may in some examples be stopped when successful transmission or delivery of at least one copy of the PDU is identified, such as for example lower layer indication and/or receipt of an acknowledgement of the PDU.

In some examples, in the event of PDCP reestablishment or PDCP data recovery, when retransmitting a SDU or PDU, if duplication is also being used, a duplicate retransmission of the corresponding PDU may also be submitted. At that point, the timer associated with the PDU may be started or restarted.

FIG. 1 is a flow chart of an example of a method 100 for submitting a PDCP PDU for transmission. The PDCP PDU may be submitted for example to a RLC entity and/or to a lower layer, for example a lower layer than an entity carrying out the method 100. This entity may be for example a PDCP entity. The method 100 comprises, in step 102, submitting the PDCP PDU to a first entity (e.g. a first RLC entity) for transmission over a first physical layer, and in step 104, submitting the PDCP PDU to a second entity (e.g. a second RLC entity, or a second part of the first RLC entity) for transmission over a second physical layer. Thus, for example, the PDU is submitted such that one or more duplicates may be transmitted (e.g. the PDU is transmitted plus one duplicate copy) according to packet duplication. The method 100 may in some examples be carried out in a wireless device such as a UE, or in a base station or a node in a network.

The method 100 also comprises, in step 106, after a predetermined time following submission of the PDCP PDU to the first entity and/or the second entity, instructing the first entity and the second entity to discard the PDCP PDU without transmission, or instructing the one of the first entity and the second entity to discard the PDCP PDU in response to an indication of transmission or delivery of the PDCP PDU by the other of the first entity and the second entity.

In the first case, comprising instructing the first entity and the second entity to discard the PDCP PDU without transmission, either entity may discard the PDU, even if it has not been transmitted yet, though in some cases it may have already been transmitted by one or both entities. However, discard after the predetermined time may ensure that the latency between submission and transmitting or reception of the PDU can in some examples be kept within a certain amount. Additionally, for example, where the PDU is transmitted by neither entity within the predetermined time, it is discarded without any transmission, which may be useful for example in certain latency-sensitive applications.

In the second case, comprising instructing the one of the first entity and the second entity to discard the PDCP PDU in response to an indication of transmission or delivery of the PDCP PDU by the other of the first entity and the second entity, the PDU may be transmitted at least once, but the non-transmitted duplicate is not transmitted after the predetermined time. This may be useful as in some examples transmission or reception of the duplicate may not be beneficial to certain latency-sensitive applications, where PDU duplication may be intended to improve the latency of transmissions.

In either case, in some examples, the PDU may be transmitted by one or both of the entities during the predetermined time. In such cases, the entity may report this to the submitting entity (e.g. PDCP entity). Then, in some examples, the entity that has not yet transmitted the PDU (or both entities) may be instructed to discard the PDU, as transmission has already occurred; transmission of the pending PDU may then not be useful.

Therefore, for example, the method 100 may comprise instructing the first entity and the second entity to discard the PDCP PDU without transmission after a predetermined time following submission of the PDCP PDU to the first entity and/or the second entity. As a result, any PDU that has not been successfully transmitted or delivered after the predetermined time may be discarded by one or both entities. In examples where the PDU has not been successfully transmitted or delivered by either entity, the PDU may be discarded by both entities and may not be transmitted over either physical layer in some examples. Thus for example transmission of "late" PDUs may not occur. If for example the PDU has been successfully transmitted or delivered by either entity (which may in some examples be unknown at this point), the other entity may discard the PDU, and hence for example the duplicate PDU may not be transmitted in such a way that it arrives at a receiver too long after the first copy of the PDU has been received. Thus, for example, if the second copy of the PDU if transmitted may not increase reliability and/or latency due to a delay by one of the entities, it may be discarded instead.

Additionally or alternatively, for example, the method 100 may comprise instructing the one of the first entity and the second entity to discard the PDCP PDU in response to an indication of transmission or delivery of the PDCP PDU by the other of the first entity and the second entity after a predetermined time following submission of the PDCP PDU to the first entity and/or the second entity. Therefore, for example, if it is known that the PDU has been successfully transmitted or delivered by one entity (e.g. following receipt of an acknowledgement by the receiver), transmission by the other entity may not increase reliability and/or latency (as the PDU has already been successfully transmitted or delivered) and hence the PDU may be discarded by the other entity instead.

In some examples, the method 100 may further comprise, in response to an indication of transmission or delivery of the PDCP PDU before the predetermined time following submission of the PDCP PDU to the first entity and/or the second entity, instructing the other of or both of the first entity and the second entity to discard the PDCP PDU.

In some examples, the method 100 may comprise starting a timer upon submitting the PDCP PDU to the first entity and/or the second entity. Thus, for example, the end of the predetermined time may be determined by monitoring the timer or receiving a notification of an event relating to the timer such as timer expiry or the timer reaching a predetermined time. In some examples, the method 100 may comprise receiving a request for PDCP entity re-establishment or PDCP data recovery. The method 100 may then comprise stopping and resetting the timer in response to the request for PDCP entity re-establishment or PDCP data recovery, and re-submitting the PDCP PDU to the first entity and/or the second entity, starting the timer, and wherein instructing the first entity and/or the second entity to discard the PDCP PDU is performed after the predetermined time (e.g. based on the timer) following resubmission of the PDCP PDU. The above-mentioned benefits of the method 100 may therefore in some examples also apply to resubmitted PDUs due to re-establishment or data recovery.

Re-submitting the PDCP PDU to the first entity and/or the second entity may in some examples performed only in response to no indication of transmission or delivery of the PDCP PDU before receiving a request for PDCP entity re-establishment or PDCP data recovery. Therefore, for example, it may be that retransmission of the PDU is not needed due to successful transmission or delivery, and hence retransmission may be avoided.

In some examples, the method comprises receiving a request for PDCP entity re-establishment or PDCP data recovery, re-submitting the PDCP PDU to the first entity and/or the second entity, and wherein instructing the first entity and/or the second entity to discard the PDCP PDU is performed after the predetermined time following resubmission of the PDCP PDU. Thus, in some examples, the predetermined time may be determined or monitored using means other than a timer.

In some examples, the first physical layer comprises a first bearer, carrier or RLC bearer, and the second physical layer comprises a second bearer, carrier or RLC bearer.

Where the method 100 is carried out by a wireless device or UE, for example, the first physical layer may comprise a path via a first base station, eNB or gNB, and the second physical layer may comprise a path via a second base station, eNB or gNB or the first base station, eNB or gNB.

Specific embodiments will now be described as non-limiting examples.

In Rel-15 NR TS 38.323, the PDCP duplication function is captured in the transmitter side as follows:

When submitting a PDCP Data PDU to lower layer, the transmitting PDCP entity shall:

[ . . . ]

else, if the transmitting PDCP entity is associated with two RLC entities:

if pdcpDuplication is configured and activated:

duplicate the PDCP Data PDU and submit the PDCP Data PDU to both associated RLC entities.

else, if pdcpDuplication is configured but not activated:

submit the PDCP Data PDU to the primary RLC entity.

This way, for each PDCP SDU, the corresponding PDCP Data PDU is duplicated and provided to each RLC entity—irrespective of transmission opportunities and their ratio on the transmission legs. For the split bearer operation, the following NOTE was added:

NOTE 2: If the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

This indicates that submission of PDCP PDUs to lower layers before transmission opportunity is indicated should be kept minimal by UE implementations. This way, low skew times below the UL transmission legs may be ensured, since data transmitted to lower layers may be more according to the UL grant ratio. This way, for split operation, eventually lower reordering times in the receiving PDCP entity may be ensured.

For duplication operation, similar considerations may be considered: instead of considering minimizing the reordering time among the transmission legs, the reception time differences of the duplicates may be considered, since PDCP data duplication can only be considered useful, e.g. for URLCC traffic, if the transmission time differences are not too high, i.e. the duplicate is not already outdated when received.

Furthermore, for PDCP data duplication, pushing down all the data (e.g. data available for transmission) immediately to both RLCs (e.g. as one or more PDUs) may lead to this data being stuck in an RLC (e.g. in a queue or buffer) for which no transmission grant will arrive for some time. This may lead to the further risk of transmission or reception of duplicate transmissions drifting apart in time, for example due to different amounts of granted resources on the links (e.g. separate physical layers, carriers, bearers etc).

In some examples, if duplication is being used (e.g. configured and activated), the UE transmitter may reduce or minimize the amount of PDCP PDUs submitted to lower layers before receiving a request from lower layers to minimize the reception time difference of the duplicates in the receiving PDCP entity.

Beside duplicate transmission, duplicate retransmission may be considered. PDCP specifies two retransmission procedures, i.e. PDCP re-establishment and PDCP data recovery. PDCP duplication may be used when undergoing these procedures, i.e. duplication may be applied before, during and/or after the procedure. To maintain the intended reliability with duplication, duplication may also be applied to retransmissions involved in these procedures. In some examples, due to release/re-establishment of lower layers involved in these procedures, the PDCP "re-transmissions" may be the first data transmissions of particular data or PDU(s), which emphasizes further that PDCP data duplication could be applied to attempt to maintain the intended reliability.

In some examples, in the event of PDCP re-establishment, for AM (Acknowledged Mode) DRBs, when retransmitting PDCP SDUs, if PDCP duplication is being used, duplicated PDCP PDUs of these SDUs may be submitted to both associated RLC entities.

In some examples, in the event of PDCP data recovery, for AM DRBs, when retransmitting PDCP PDUs, if PDCP duplication is being used, duplicated PDCP PDUs are submitted to both associated RLC entities.

In an example transmit operation, when duplication is being used, when submitting a PDCP Data PDU for transmission, the PDU may be duplicated and submitted to both associated RLC entities (TS 38.323, section 5.21). The transmission of the PDUs on the lower layers (e.g. lower than a PDCP entity) may be subject to different latencies in the respective RLC entities resulting from e.g. RLC queuing, RLC retransmissions, RLC segmentation, HARQ retransmissions, different numerologies on the involved carriers, un-synchronized scheduling), and/or any other factors. Therefore, when providing PDCP duplicates to the two associated lower layers, transmission of the duplicates or reception at a node (or separate nodes) cannot be assumed to occur at the same time. When the reception time difference becomes too large, reception of the later duplicate becomes redundant, thus transmission of the duplicate may be avoided in this case. Therefore, the following cases may be considered on PDCP within the discard procedure when duplication is used.

In some examples, with a discard timer, the PDCP SDU discard timer considers a maximum waiting time of a PDCP SDU in the transmit buffer. Upon expiry, e.g. after the maximum waiting time, the SDU as well as the corresponding PDU is discarded, and the discard is indicated to RLC, where RLC SDU or PDU, if not yet transmitted, is discarded as well.

In some examples, when successful delivery of a PDCP SDU is confirmed by a PDCP status report, the SDU along with PDU is discarded as well, and discard is indicated to RLC.

In some examples, during packet duplication where a PDCP PDU is submitted to two RLC entities for transmission, in Acknowledged Mode (AM), where successful delivery of a PDU is indicated from one RLC entity (e.g. due to RLC status report reception) to PDCP, and where transmission of the duplicate of this PDU may still be ongoing in the other RLC entity or may not yet have commenced (e.g. as it is slower or more congested). In this case, the transmission of the duplicate is redundant, as one PDU has already been delivered. It is useful to discard the duplicate in this case, in order to avoid overhead or unnecessary use of the communications medium, as well as to reduce the queuing times for subsequent PDUs to be transmitted in the slower or more congested RLC entity. As described above, avoiding reception time differences among the duplicate transmission may be beneficial for the usefulness of the PDCP data duplication feature. Therefore, in some examples, an indication of a successful delivery of an PDCP PDU indicated by one RLC entity should trigger the discard of the corresponding PDCP PDU duplicate on the other RLC entity. In RLC, the currently specified RLC procedures may apply, i.e. the corresponding RLC SDU and RLC PDU is discarded in case it had not been transmitted yet.

Therefore, in some examples, for DC and CA PDCP duplication, when the successful delivery of a PDCP PDU is confirmed by one of the associated RLC entities:

PDCP shall discard the PDCP PDU along with the corresponding PDCP SDU.

PDCP should indicate to the other associated RLC entity to discard the corresponding PDCP PDU (in some examples, the PDCP entity should indicate to both of the RLC entities to discard the PDCP PDU; one entity may ignore the indication as the PDCP PDU has already been transmitted and delivered).

Similar to AM operation, in Unacknowledged Mode (UM) operation, due to transmission of PDCP PDU duplicate to the two RLC entities, and their potentially different transmission times on these RLC entities, reception time differences of the duplicates may increase beyond a point where a duplicate reception is still useful. The case that duplicate transmissions among the RLC entities drift apart in time is thus preferably avoided.

In an example, for URLLC support, any queuing delay that a duplicate transmission might undergo, if the original transmission (e.g. one of the duplicate PDUs) takes place immediately, may defeat the purpose of duplicate transmissions. For example, if a PDU is pushed (e.g. submitted) as original and duplicate to RLC entities RLC1 and RLC2 respectively, and transmitted via RLC1 but queuing up for some time in RLC2 (e.g. as previous duplicate packets were pushed to RLC2), the PDU duplicate may be delayed and get transmitted only after the RLC2 queuing time. At the time of the reception, the PDU duplicate may not be useful.

For AM, successful transmission is indicated to PDCP, and from that point onwards, no duplicate of this PDU is needed or useful anymore. For UM, another mechanism may be established. For example, a PDCP PDU should be discarded for duplicate transmission if it could not be transmitted within a certain time after the original had been sent, or within a certain time following submission to one or more RLC entities for transmission over the associated physical channel. The time may in some examples be configurable according to traffic latency targets. Since successful transmission is indicated in AM towards PDCP based on the RLC status report frequency, which may be configured conservatively for overhead avoidance, it may also be useful to use the timer-based discard in addition or as an alternative in AM mode, leading to a potentially quicker discard.

In some examples, this can be implemented by a timer which can be implemented in the PDCP or RLC entity or layer. If implemented in RLC, the timer could represent for example a maximum queuing time in the respective RLC entity. Both options would be different to the PDCP discard timer, since the PDCP discard timer relates to a maximum queuing time before the first (original) transmission of the PDU.

Where the duplication function is introduced in the PDCP layer, a solution where a PDU discard timer is introduced in PDCP is proposed in an example. For DC and CA PDCP duplication, a PDCP PDU discard timer may be started when a PDCP PDU is initially submitted to lower layers (e.g. RLC entities). At expiry of the timer:

PDCP shall discard the PDCP PDU along with the corresponding PDCP SDU; and

PDCP should indicate to lower layers to discard the corresponding PDCP PDU.

One timer instance may be provided per submitted duplicate PDCP PDU pair. Since in some examples submission of the two duplicates happens at the same time, only one timer per pair may be utilized.

Furthermore, in some examples, the timer may be stopped when successful transmission or delivery of a PDU is indicated to PDCP, e.g. by PDCP status reporting, or by indication from lower layers, e.g. RLC. At this point in time the corresponding PDU should be discarded, which may lead also to the timer being stopped.

Moreover, in some examples, when duplication is being used, when duplicate retransmissions are triggered (e.g. in the event of PDCP re-establishment or PDCP data recovery), e.g. for AM-mode, the timer should be started for PDCP PDUs that have not yet been transmitted during the retransmission procedure, and should be re-started for PDUs already transmitted (or submitted) and now being retransmitted during the retransmission procedure.

Furthermore, for UM operation, where no retransmissions are invoked during PDCP re-establishment, the timer may in some examples be reset for all PDCP PDUs (e.g. those pending to be transmitted).

The handling of expiry of the timer can be realized in two example variants: first, when the timer expires, the discard command is indicated to both lower layers (e.g. both RLC entities), leading to a discard of both duplicate PDCP PDUs. In this case, if neither of the duplicate PDUs has been transmitted yet, this leads to discard and non-transmission of the PDU. This may be useful for services or traffic (e.g. URLLC) where a strict latency limit is required, i.e. PDUs received after a certain time are not useful. In a second variant, it is checked (e.g. by observing indications of successful delivery) whether successful transmission has taken place yet, and the discard indication is provided from PDCP to lower layers when at least one of the duplicates has been transmitted or successfully delivered.

Figure 2:
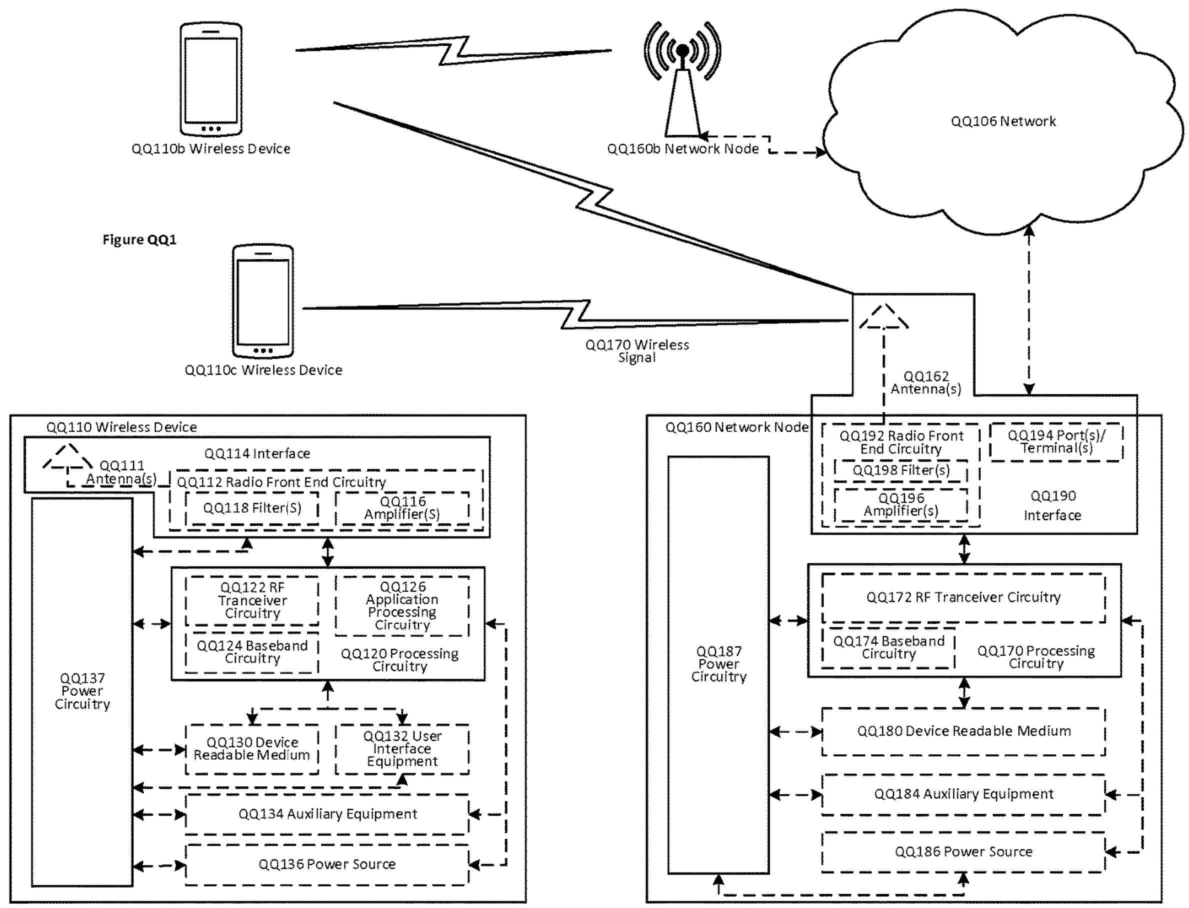
FIG. 2 shows an example of a wireless network.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and Alternative embodiments of network node QQ160 may include additional components beyond those shown in FIG. 2 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Figure 3:
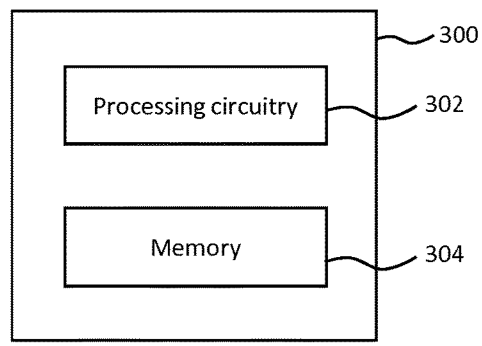
FIG. 3 shows an example of an apparatus for submitting a PDCP PDU for transmission.

FIG. 3 shows an example of apparatus 300 for submitting a PDCP PDU for transmission. The apparatus 300 comprises a processor 302 and a memory 304. The memory 304 contains instructions executable by the processor 302 such that the apparatus 300 is operable to submit the PDCP PDU to a first entity for transmission over a first physical layer, submit the PDCP PDU to a second entity for transmission over a second physical layer, and, after a predetermined time following submission of the PDCP PDU to the first entity and/or the second entity, instruct the first entity and the second entity to discard the PDCP PDU without transmission or instruct the one of the first entity and the second entity to discard the PDCP PDU in response to an indication of transmission or delivery of the PDCP PDU by the other of the first entity and the second entity.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 4:
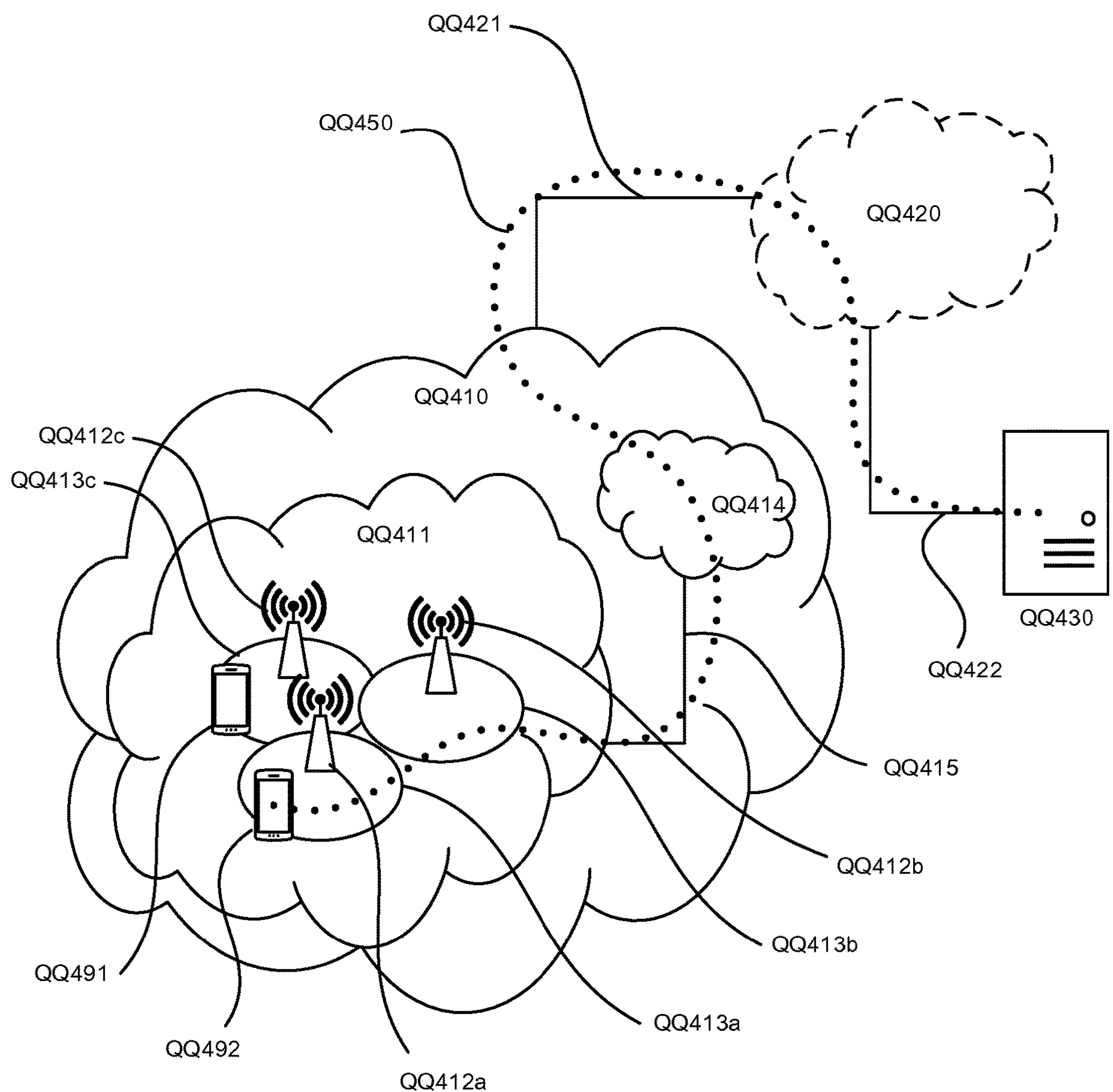
FIG. 4 shows a telecommunication network connected via an intermediate network to a host computer in accordance with some embodiments.

With reference to FIG. 4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 5) served by base station QQ520. Communication interface QQ526 may be configured to facilitate connection QQ560 to host computer QQ510. Connection QQ560 may be direct or it may pass through a core network (not shown in FIG. 5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 5:
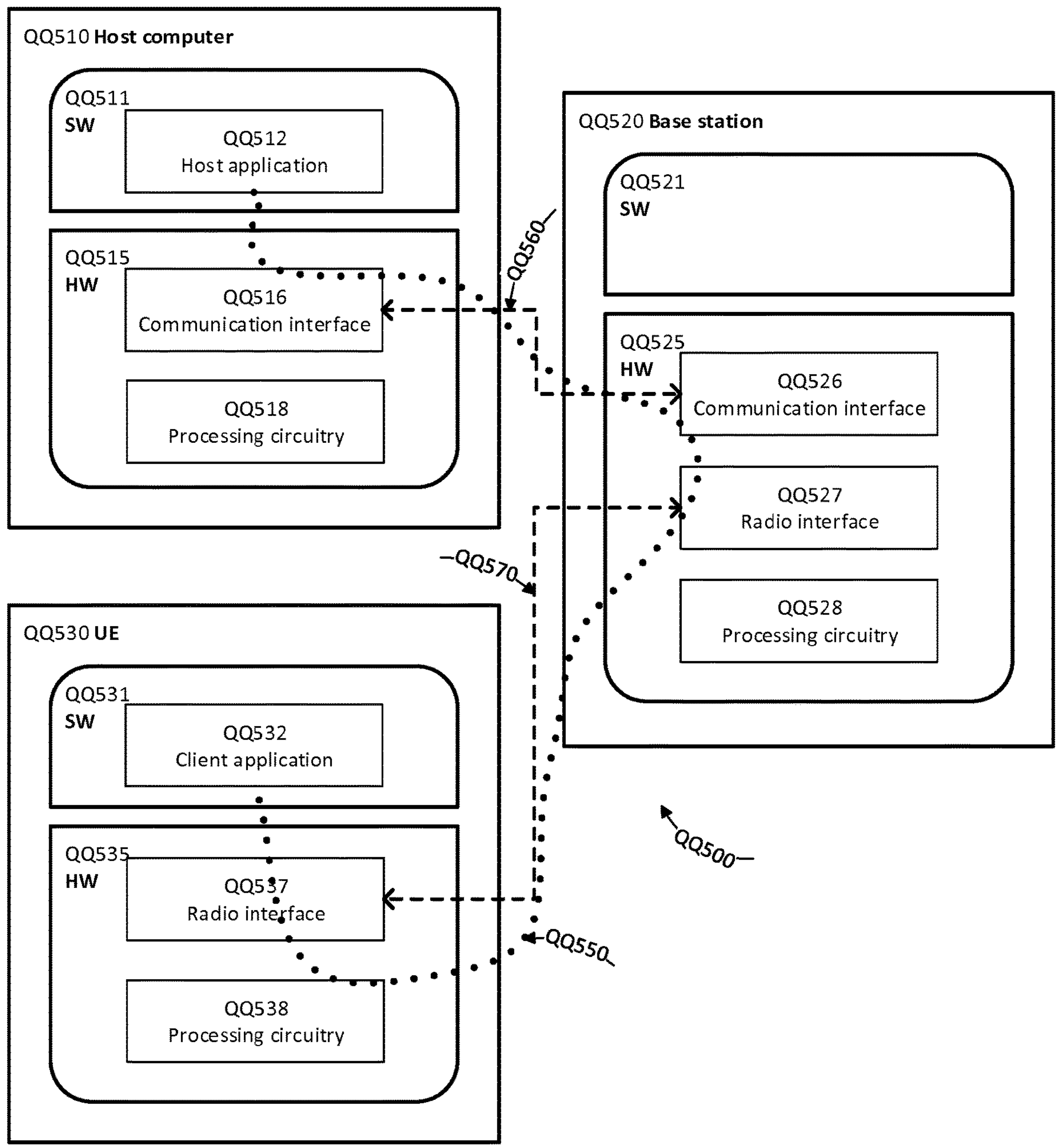
FIG. 5 shows a host computer communicating via a base station with a user equipment over a partially wireless connection in accordance with some embodiments.

It is noted that host computer QQ510, base station QQ520 and UE QQ530 illustrated in FIG. 5 may be similar or identical to host computer QQ430, one of base stations QQ412*a*, QQ412*b*, QQ412*c* and one of UEs QQ491, QQ492 of FIG. 4, respectively. This is to say, the inner workings of these entities may be as shown in FIG. 5 and independently, the surrounding network topology may be that of FIG. 4.

In FIG. 5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency and/or reliability of certain communications, and thereby provide benefits such as reduced latency and/or increased reliability of communications.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 6:
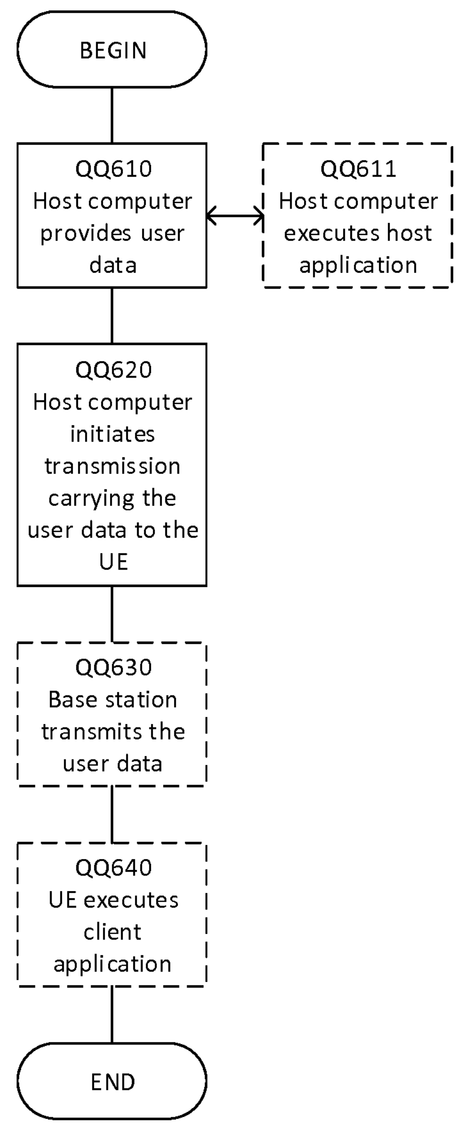
FIGS. 6 to 9 are flowcharts illustrated methods implemented in a communication system including a host computer, a base station and a user equipment in accordance with some embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 7:
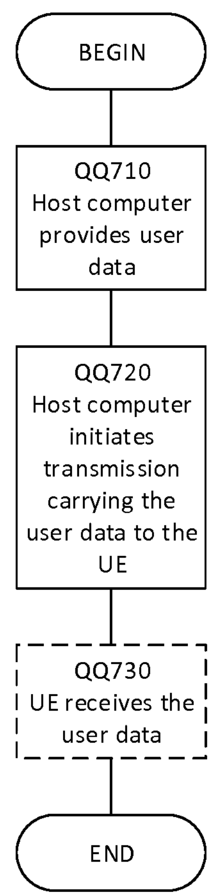

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 8:
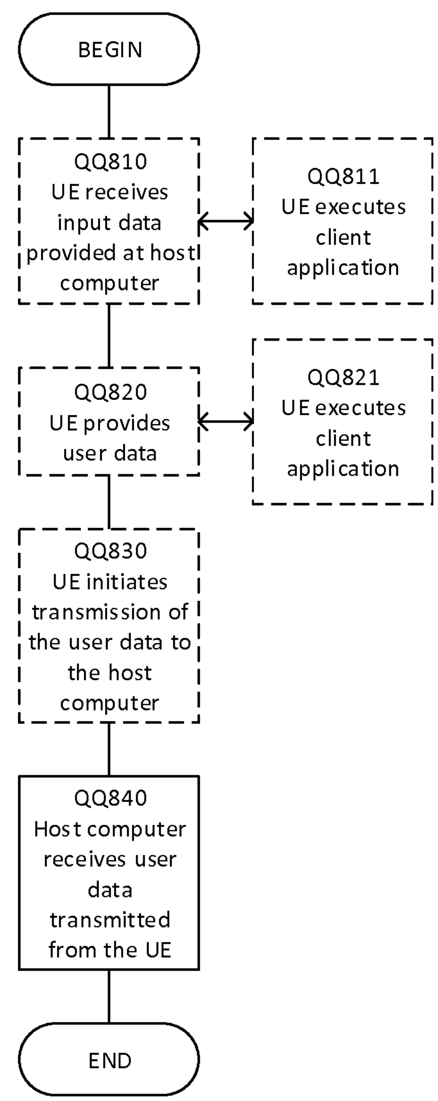

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 9:
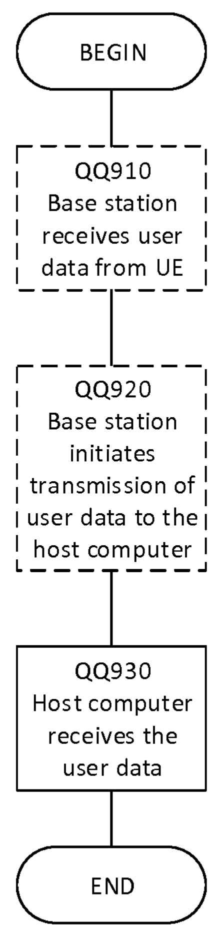

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following numbered statements set out embodiments of the disclosure.

Group A Embodiments

1. A method performed by a wireless device for submitting a PDCP PDU for transmission, the method comprising:
   submitting the PDCP PDU to a first entity for transmission over a first physical layer;
   submitting the PDCP PDU to a second entity for transmission over a second physical layer; and
   after a predetermined time following submission of the PDCP PDU to the first entity and/or the second entity:

i. instructing the first entity and the second entity to discard the PDCP PDU without transmission; or ii. instructing the one of the first entity and the second entity to discard the PDCP PDU in response to an indication of transmission or delivery of the PDCP PDU by the other of the first entity and the second entity.

2. The method of embodiment 1, further comprising, in response to an indication of transmission or delivery of the PDCP PDU before the predetermined time following submission of the PDCP PDU to the first entity and/or the second entity, instructing the other of or both of the first entity and the second entity to discard the PDCP PDU.

3. The method of embodiment 1 or 2, comprising starting a timer upon submitting the PDCP PDU to the first entity and/or the second entity.

4. The method of embodiment 3, comprising determining the predetermined time following submission of the PDCP PDU to the first entity and/or the second entity based on the timer.

5. The method of embodiment 4, wherein determining the predetermined time following submission of the PDCP PDU to the first entity and/or the second entity based on the timer comprises determining expiry of the timer.

6. The method of any of embodiments 3 to 5, comprising receiving a request for PDCP entity re-establishment or PDCP data recovery.

7. The method of embodiment 6, comprising stopping and resetting the timer in response to the request for PDCP entity re-establishment or PDCP data recovery.

8. The method of embodiment 7, comprising re-submitting the PDCP PDU to the first entity and/or the second entity, starting the timer, and wherein instructing the first entity and/or the second entity to discard the PDCP PDU is performed after the predetermined time following resubmission of the PDCP PDU.

9. The method of embodiment 8, wherein re-submitting the PDCP PDU to the first entity and/or the second entity is performed only in response to no indication of transmission or delivery of the PDCP PDU before receiving a request for PDCP entity re-establishment or PDCP data recovery.

10. The method of embodiment 8 or 9, comprising determining the predetermined time following resubmission of the PDCP PDU to the first entity and/or the second entity based on the timer.

11. The method of embodiment 10, wherein determining the predetermined time following resubmission of the PDCP PDU to the first entity and/or the second entity based on the timer comprises determining expiry of the timer.

12. The method of any of embodiments 1 to 5, comprising receiving a request for PDCP entity re-establishment or PDCP data recovery.

13. The method of embodiment 12, comprising re-submitting the PDCP PDU to the first entity and/or the second entity, and wherein instructing the first entity and/or the second entity to discard the PDCP PDU is performed after the predetermined time following resubmission of the PDCP PDU.

14. The method of embodiment 13, wherein re-submitting the PDCP PDU to the first entity and/or the second entity is performed only in response to no indication of transmission or delivery of the PDCP PDU before receiving a request for PDCP entity re-establishment or PDCP data recovery.

15. The method of any of embodiments 12 to 14, wherein the request for PDCP entity re-establishment or PDCP data recovery is received from a higher level entity.

16. The method of any of embodiments 1 to 15, wherein the method is carried out at least in part by a PDCP entity.

17. The method of any of embodiments 1 to 16, wherein the first entity is a first lower level entity, and/or the second entity is a second lower level entity.

18. The method of any of embodiments 1 to 17, wherein the first entity is a first RLC entity, and/or the second entity is a second RLC entity.

19. The method of any of embodiments 1 to 18, wherein the method is performed when packet duplication is activated.

20. The method of any of embodiments 1 to 19, wherein the first physical layer comprises a first bearer, carrier or RLC bearer, and the second physical layer comprises a second bearer, carrier or RLC bearer.

21. The method of any of embodiments 1 to 20, wherein the first physical layer comprises a path via a first base station, eNB or gNB, and the second physical layer comprises a path via a second base station, eNB or gNB.

22. The method of embodiment 1 to 21, wherein the wireless device operates in Dual Connectivity mode.

23. The method of any of embodiments 1 to 20, wherein the first physical layer comprises a path via a first base station, eNB or gNB, and the second physical layer comprises a path via the first base station, eNB or gNB.

24. The method of embodiment 23, wherein the wireless device uses Carrier Aggregation.

25. The method of any of embodiments 1 to 24, wherein an indication of transmission or delivery of the PDCP PDU is received from the first entity and/or the second entity.

26. The method of any of embodiments 1 to 25, comprising instructing the other of the first entity and the second entity to discard the PDCP PDU in response to an indication of transmission or delivery of the PDCP PDU by the other of the first entity and the second entity.

27. The method of any of the previous embodiments, further comprising:

providing user data; and forwarding the user data to a host computer via the transmission to the base station.

Group B Embodiments

28. A method performed by a base station for submitting a PDCP PDU for transmission, the method comprising:

submitting the PDCP PDU to a first entity for transmission over a first physical layer;

submitting the PDCP PDU to a second entity for transmission over a second physical layer; and after a predetermined time following submission of the PDCP PDU to the first entity and/or the second entity:

i. instructing the first entity and the second entity to discard the PDCP PDU without transmission; or ii. instructing the one of the first entity and the second entity to discard the PDCP PDU in response to an indication of transmission or delivery of the PDCP PDU by the other of the first entity and the second entity.

29. The method of embodiment 28, further comprising, in response to an indication of transmission or delivery of the PDCP PDU before the predetermined time following submission of the PDCP PDU to the first entity and/or the second entity, instructing the other of or both of the first entity and the second entity to discard the PDCP PDU.
30. The method of embodiment 28 or 29, comprising starting a timer upon submitting the PDCP PDU to the first entity and/or the second entity.
31. The method of embodiment 30, comprising determining the predetermined time following submission of the PDCP PDU to the first entity and/or the second entity based on the timer.
32. The method of embodiment 31, wherein determining the predetermined time following submission of the PDCP PDU to the first entity and/or the second entity based on the timer comprises determining expiry of the timer.
33. The method of any of embodiments 28 to 32, comprising receiving a request for PDCP entity re-establishment or PDCP data recovery.
34. The method of embodiment 33, comprising stopping and resetting the timer in response to the request for PDCP entity re-establishment or PDCP data recovery.
35. The method of embodiment 34, comprising re-submitting the PDCP PDU to the first entity and/or the second entity, starting the timer, and wherein instructing the first entity and/or the second entity to discard the PDCP PDU is performed after the predetermined time following resubmission of the PDCP PDU.
36. The method of embodiment 35, wherein re-submitting the PDCP PDU to the first entity and/or the second entity is performed only in response to no indication of transmission or delivery of the PDCP PDU before receiving a request for PDCP entity re-establishment or PDCP data recovery.
37. The method of embodiment 35 or 36, comprising determining the predetermined time following resubmission of the PDCP PDU to the first entity and/or the second entity based on the timer.
38. The method of embodiment 37, wherein determining the predetermined time following resubmission of the PDCP PDU to the first entity and/or the second entity based on the timer comprises determining expiry of the timer.
39. The method of any of embodiments 28 to 32, comprising receiving a request for PDCP entity re-establishment or PDCP data recovery.
40. The method of embodiment 39, comprising re-submitting the PDCP PDU to the first entity and/or the second entity, and wherein instructing the first entity and/or the second entity to discard the PDCP PDU is performed after the predetermined time following resubmission of the PDCP PDU.
41. The method of embodiment 40, wherein re-submitting the PDCP PDU to the first entity and/or the second entity is performed only in response to no indication of transmission or delivery of the PDCP PDU before receiving a request for PDCP entity re-establishment or PDCP data recovery.
42. The method of any of embodiments 39 to 41, wherein the request for PDCP entity re-establishment or PDCP data recovery is received from a higher level entity.
43. The method of any of embodiments 28 to 42, wherein the method is carried out at least in part by a PDCP entity.
44. The method of any of embodiments 28 to 43, wherein the first entity is a first lower level entity, and/or the second entity is a second lower level entity.
45. The method of any of embodiments 28 to 44, wherein the first entity is a first RLC entity, and/or the second entity is a second RLC entity.
46. The method of any of embodiments 28 to 45, wherein the method is performed when packet duplication is activated.
47. The method of any of embodiments 28 to 46, wherein the first physical layer comprises a first bearer, carrier or RLC bearer, and the second physical layer comprises a second bearer, carrier or RLC bearer.
48. The method of any of embodiments 28 to 47, wherein an indication of transmission or delivery of the PDCP PDU is received from the first entity and/or the second entity.
49. The method of any of embodiments 28 to 48, comprising instructing the other of the first entity and the second entity to discard the PDCP PDU in response to an indication of transmission or delivery of the PDCP PDU by the other of the first entity and the second entity.
50. The method of any of the previous embodiments, further comprising:
    obtaining user data; and
    forwarding the user data to a host computer or a wireless device.

Group C Embodiments

51. A wireless device for submitting a PDCP PDU for transmission, the wireless device comprising:
    processing circuitry configured to perform any of the steps of any of the Group A embodiments; and
    power supply circuitry configured to supply power to the wireless device.
52. A base station for submitting a PDCP PDU for transmission, the base station comprising:
    processing circuitry configured to perform any of the steps of any of the Group B embodiments;
    power supply circuitry configured to supply power to the base station.
53. A user equipment (UE) for submitting a PDCP PDU for transmission, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
54. A communication system including a host computer comprising:
    processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:

the processing circuitry of the host computer is configured to execute a host application, thereby providing the user data; and the UE comprises processing circuitry configured to execute a client application associated with the host application.

58. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

59. The method of the previous embodiment, further comprising, at the base station, transmitting the user data.

60. The method of the previous 2 embodiments, wherein the user data is provided at the host computer by executing a host application, the method further comprising, at the UE, executing a client application associated with the host application.

61. A user equipment (UE) configured to communicate with a base station, the UE comprising a radio interface and processing circuitry configured to performs the of the previous 3 embodiments.

62. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

63. The communication system of the previous embodiment, wherein the cellular network further includes a base station configured to communicate with the UE.

64. The communication system of the previous 2 embodiments, wherein:

the processing circuitry of the host computer is configured to execute a host application, thereby providing the user data; and the UE's processing circuitry is configured to execute a client application associated with the host application.

65. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

66. The method of the previous embodiment, further comprising at the UE, receiving the user data from the base station.

67. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

68. The communication system of the previous embodiment, further including the UE.

69. The communication system of the previous 2 embodiments, further including the base station, wherein the base station comprises a radio interface configured to communicate with the UE and a communication interface configured to forward to the host computer the user data carried by a transmission from the UE to the base station.

70. The communication system of the previous 3 embodiments, wherein:

the processing circuitry of the host computer is configured to execute a host application; and the UE's processing circuitry is configured to execute a client application associated with the host application, thereby providing the user data.

71. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

72. A method implemented in a communication system including a host computer, a base station and a user equipment (UE), the method comprising:

at the host computer, receiving user data transmitted to the base station from the UE, wherein the UE performs any of the steps of any of the Group A embodiments.

73. The method of the previous embodiment, further comprising, at the UE, providing the user data to the base station.

74. The method of the previous 2 embodiments, further comprising:

at the UE, executing a client application, thereby providing the user data to be transmitted; and at the host computer, executing a host application associated with the client application.

75. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

76. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

77. The communication system of the previous embodiment further including the base station.

78. The communication system of the previous 2 embodiments, further including the UE, wherein the UE is configured to communicate with the base station.

79. The communication system of the previous 3 embodiments, wherein:

the processing circuitry of the host computer is configured to execute a host application;

the UE is configured to execute a client application associated with the host application, thereby providing the user data to be received by the host computer.

80. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

81. The method of the previous embodiment, further comprising at the base station, receiving the user data from the UE.

82. The method of the previous 2 embodiments, further comprising at the base station, initiating a transmission of the received user data to the host computer.

The invention claimed is:

1. A method for submitting a Packet Data Convergence Protocol (PDCP) Protocol Data Unit (PDU) for transmission, the method comprising:

submitting the PDCP PDU to a first entity for transmission over a first physical layer;

submitting the PDCP PDU to a second entity for transmission over a second physical layer;

determining whether a time period has elapsed since the submission of the PDCP PDU to the first entity and the second entity, the time period having a predetermined duration;

in response to determining that the time period has elapsed:

instructing the first entity and the second entity to discard the PDCP PDU without transmission; or instructing one of the first entity and the second entity to discard the PDCP PDU in response to an indication of transmission or delivery of the PDCP PDU by the other of the first entity and the second entity.

2. The method of claim 1, further comprising, in response to an indication of successful delivery of the PDCP PDU by one of the first entity and the second entity before elapsing of the time period following the submission, instructing at least the other of the first entity and the second entity to discard the PDCP PDU.

3. The method of claim 1, wherein the method comprises starting a discard timer upon submitting the PDCP PDU to the first entity and/or the second entity.

4. The method of claim 3, wherein the determining whether the time period has elapsed is based on the discard timer.

5. The method of claim 4, wherein the determining whether the time period has elapsed comprises determining expiry of the discard timer.

6. The method of claim 3, wherein the method comprises:

receiving a request for PDCP entity re-establishment or PDCP data recovery;

stopping and resetting the discard timer in response to the request for PDCP entity re-establishment or PDCP data recovery; and re-submitting the PDCP PDU to the first entity and the second entity, and starting the discard timer in response to the resubmission of PDCP PDU to the first entity and the second entity; and wherein instructing the first entity and/or the second entity to discard the PDCP PDU is performed after the predetermined duration of time following resubmission of the PDCP PDU.

7. The method of claim 6, wherein the re-submitting the PDCP PDU is performed only in response to no indication of transmission or delivery of the PDCP PDU before receiving a request for PDCP entity re-establishment or PDCP data recovery.

8. The method of claim 6, wherein the determining whether the time period has elapsed occurs following resubmission of the PDCP PDU to the first entity and/or the second entity and based on the discard timer.

9. The method of claim 1, wherein the method comprises:

receiving a request for PDCP entity re-establishment or PDCP data recovery;

re-submitting the PDCP PDU to the first entity and the second entity; and wherein instructing the first entity and/or the second entity to discard the PDCP PDU is performed after the predetermined time following the resubmission of the PDCP PDU.

10. The method of claim 9, wherein the re-submitting the PDCP PDU is performed only in response to no indication of transmission or delivery of the PDCP PDU before receiving a request for PDCP entity re-establishment or PDCP data recovery.

11. The method of claim 1, wherein the first entity is a first RLC entity, and/or the second entity is a second RLC entity.

12. The method of claim 1:

wherein the first physical layer comprises a first bearer, carrier, or RLC bearer; and wherein the second physical layer comprises a second bearer, carrier, or RLC bearer.

13. The method of claim 1, wherein the method is performed by a wireless device.

14. The method of claim 13:

wherein the first physical layer comprises a path via a first base station; and wherein the second physical layer comprises a path via a second base station or the first base station.

15. The method of claim 1, wherein the method is performed by a base station.

16. A non-transitory computer readable recording medium storing a computer program product for submitting a Packet Data Convergence Protocol (PDCP) Protocol Data Unit (PDU) for transmission, the computer program product comprising program instructions which, when run on processing circuitry, causes the processing circuitry:

submit the PDCP PDU to a first entity for transmission over a first physical layer;

submit the PDCP PDU to a second entity for transmission over a second physical layer;

determine whether a time period has elapsed since the submission of the PDCP PDU to the first entity and the second entity, the time period having a predetermined duration;

in response to determining that the time period has elapsed:

instruct the first entity and the second entity to discard the PDCP PDU without transmission; or instruct one of the first entity and the second entity to discard the PDCP PDU in response to an indication of transmission or delivery of the PDCP PDU by the other of the first entity and the second entity.

17. An apparatus for submitting a Packet Data Convergence Protocol (PDCP) Protocol Data Unit (PDU) for transmission, the apparatus comprising:

processing circuitry;

memory containing instructions executable by the processing circuitry whereby the apparatus is operative to:

submit the PDCP PDU to a first entity for transmission over a first physical layer;

submit the PDCP PDU to a second entity for transmission over a second physical layer;

determine whether a time period has elapsed since the submission of the PDCP PDU to the first entity and the second entity, the time period having a predetermined duration;

in response to determining that the time period has elapsed:

instruct the first entity and the second entity to discard the PDCP PDU without transmission; or instruct one of the first entity and the second entity to discard the PDCP PDU in response to an indication of transmission or delivery of the PDCP PDU by the other of the first entity and the second entity.

18. The apparatus of claim 17, wherein the apparatus comprises a wireless device or a base station.

19. The apparatus of claim 17, wherein the instructions are such that the apparatus is operative to instruct, in response to an indication of successful delivery of the PDCP PDU by one of the first entity and second entity before elapsing of the time period following the submission, at least the other of the first entity and the second entity to discard the PDCP PDU.

20. The apparatus of claim 17, wherein the instructions are such that the apparatus is operative to:

start a discard timer upon submitting the PDCP PDU to the first entity and/or the second entity; and determine whether the time period has elapsed based on the discard timer.

* * * * *